United States Patent
Sonoda et al.

(10) Patent No.: US 10,353,374 B2
(45) Date of Patent: Jul. 16, 2019

(54) SERVO CONTROLLER, CONTROL METHOD, AND COMPUTER-READABLE RECORDING MEDIUM FOR MACHINE TOOL USED FOR OSCILLATING CUTTING

(71) Applicant: FANUC CORPORATION, Yamanashi (JP)

(72) Inventors: Naoto Sonoda, Yamanashi (JP); Makoto Haga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 11 days.

(21) Appl. No.: 15/470,093

(22) Filed: Mar. 27, 2017

(65) Prior Publication Data

US 2017/0285608 A1    Oct. 5, 2017

(30) Foreign Application Priority Data

Mar. 29, 2016    (JP) .................. 2016-066593

(51) Int. Cl.
  *G05B 19/402*    (2006.01)
  *G05B 19/408*    (2006.01)
  (Continued)

(52) U.S. Cl.
  CPC .......... *G05B 19/402* (2013.01); *G05B 19/18* (2013.01); *G05B 19/4083* (2013.01);
  (Continued)

(58) Field of Classification Search
  CPC .......... G05B 19/402; G05B 19/41815; G05B 19/416; G05B 19/4099; G05B 19/4083; G05B 19/40938; Y02P 90/02
  (Continued)

(56) References Cited

U.S. PATENT DOCUMENTS

2007/0007927 A1*   1/2007   Terada ............... G05B 5/01
                                                        318/630
2011/0254496 A1*   10/2011  Barkman ........... B23Q 17/20
                                                        318/561
(Continued)

FOREIGN PATENT DOCUMENTS

CN    103328154    9/2013
CN    104423319    3/2015
(Continued)

OTHER PUBLICATIONS

Office Action dated Oct. 8, 2018 in Chinese Application No. 201710193267.0.
(Continued)

*Primary Examiner* — Ziaul Karim
(74) *Attorney, Agent, or Firm* — Wenderoth, Lind & Ponack, L.L.P.

(57) ABSTRACT

A controller including: a positional deviation calculating unit that calculates positional deviation using a position command directed to a servo motor for driving a cutting tool, etc., and a position feedback value corresponding to the position of the cutting tool, etc.; an oscillation command calculating unit that calculates an oscillation command using the position command and a spindle axis angle of the rotated work, etc., or using the position feedback value and the spindle axis angle; an oscillation offset calculating unit that calculates an offset for the oscillation command using the positional deviation, the oscillation command, and the spindle axis angle; and a driving unit that determines a drive signal for the servo motor based on the positional deviation, the oscillation command, and the oscillation offset, and outputs the drive signal.

12 Claims, 4 Drawing Sheets (51) Int. Cl.
  *G05B 19/4093* (2006.01)
  *G05B 19/4099* (2006.01)
  *G05B 19/416* (2006.01)
  *G05B 19/418* (2006.01)
  *G05B 19/18* (2006.01)

(52) U.S. Cl.
  CPC ... *G05B 19/4099* (2013.01); *G05B 19/40938* (2013.01); *G05B 19/416* (2013.01); *G05B 19/41815* (2013.01); *G05B 2219/41229* (2013.01); *G05B 2219/49055* (2013.01); *G05B 2219/49314* (2013.01)

(58) Field of Classification Search
  USPC .......................................................... 700/187
  See application file for complete search history.

(56) References Cited

U.S. PATENT DOCUMENTS

| | | | | |
|---|---|---|---|---|
| 2012/0194121 | A1* | 8/2012 | Miyaji | G05B 19/404 318/615 |
| 2012/0299232 | A1* | 11/2012 | Kawamura | G05B 19/404 269/58 |
| 2014/0102268 | A1 | 4/2014 | Hariki et al. | |
| 2016/0011579 | A1 | 1/2016 | Watanabe et al. | |

FOREIGN PATENT DOCUMENTS

| | | | |
|---|---|---|---|
| CN | 105122161 | 12/2015 | |
| CN | 105144008 | 12/2015 | |
| JP | 2008-221427 | 9/2008 | |
| JP | 2008-225533 | 9/2008 | |
| JP | 2010-271854 | 12/2010 | |
| JP | 5033929 | 7/2012 | |
| JP | 5599523 | 8/2014 | |
| JP | 2016-031735 | 3/2016 | |
| TW | 200604503 | 2/2006 | |
| WO | 2014/125569 | 8/2014 | |
| WO | 2015/140905 | 9/2015 | |
| WO | WO-2015140905 A1 * | 9/2015 | .......... G05B 19/404 |
| WO | 2015/162739 | 10/2015 | |
| WO | 2016/031897 | 3/2016 | |

OTHER PUBLICATIONS

Written Opposition dated Jan. 9, 2019 to Japanese Patent No. 6342935.

* cited by examiner

SERVO CONTROLLER, CONTROL METHOD, AND COMPUTER-READABLE RECORDING MEDIUM FOR MACHINE TOOL USED FOR OSCILLATING CUTTING

This application is based on and claims the benefit of priority from Japanese Patent Application No. 2016-066593, filed on 29 Mar. 2016, the content of which is incorporated herein by reference.

BACKGROUND OF THE INVENTION

Field of the Invention

The present invention relates to a servo controller, a control method, and a computer-readable recording medium for a machine tool used for machining by cutting of a work by means of coordinated motion of multiple axes.

Related Art

There is a machine tool conventionally known used for machining by cutting of a work as a machining target by means of coordinated motion of multiple axes. According to a machining method employed in some cases for such a machine tool, to shred chips caused by cutting, a cutting tool and a work are caused to oscillate relative to each other in a machining direction.

For example, patent document 1 mentioned below discloses a technique of machining by cutting performed by causing a cutting tool to vibrate at a low frequency. The technique of patent document 1 has a control mechanism that causes the cutting tool to vibrate at a low frequency in a 2-axis direction by controlling a cutting tool feed drive motor. The following data is stored in advance in the form of a table as data that allows actual operation at a low frequency of 25 Hz or more of feeding the cutting tool by synchronizing the cutting tool at least in the 2-axis direction, in a manner that depends on the number of rotations of a work or the number of rotations of the cutting tool and the amount of feed of the cutting tool during one rotation of the work or that of the cutting tool: the amount of forward motion, the amount of backward motion, a forward motion speed, and a backward motion speed of a cutting tool feed mechanism that is responsive to mechanical characteristics on the table such as mass and motor characteristics. Based on the stored data, the cutting tool feed drive motor is controlled. Patent document 1 recites that, by realizing cutting by generating low-frequency vibration optimally, chips are shredded into powder form to make it unlikely that the chips will become attached to the cutting tool. According to patent document 1, however, an oscillation command responsive to the motor characteristics is stored in advance in the table. Hence, low-frequency vibration (oscillation) is considered to be difficult to respond to a change in a machining condition.

Patent document 2 mentioned below discloses a technique by which an oscillation command is generated so as to allow application of vibration along a machining route based on given vibration conditions such as frequency and amplitude. For example, the generated oscillation command is superimposed on a machining command, and a resultant command is distributed to servo control on each axis. More specifically, to move a tool along a movement route relative to a machining target, the tool is caused to vibrate so as to trace the movement route. A command stroke (a stroke given by a movement command) in a unit of time (an interpolation cycle) is calculated using the movement command including the movement route indicating a machining position and a machining speed. A vibration stroke, which is a stroke resulting from vibration occurring in this unit of time at a moment corresponding to the movement command, is calculated using the vibration conditions including frequency and amplitude. The command stroke and the vibration stroke are combined to calculate a composite stroke. Then, a stroke in the unit of time is determined in such a manner that a position determined after movement of the composite stroke is located on a curve movement route. Patent document 2 recites that this method achieves machining under various conditions without the need of preparing a table storing vibration conditions for a tool. Regarding patent document 2, however, applying high-frequency oscillation is considered to cause a probability of failing to give a command precisely. This becomes a problematic issue if an oscillation frequency is increased to approach a command distribution frequency. If the command distribution frequency is 100 Hz and the oscillation frequency is 50 Hz, for example, commands can be given to only two points in one oscillation cycle. This tendency becomes more noticeable if the oscillation frequency is increased further to get closer the command distribution frequency.

Patent Document 1: Japanese Patent No. 5033929
Patent Document 2: Japanese Patent No. 5599523

SUMMARY OF THE INVENTION

The present invention has been made in view of the aforementioned problem. The present invention is intended to provide a controller capable of achieving high-precision oscillating motion even with the use of a high oscillation frequency.

(1) A controller according to the present invention (a servo controller 100a or 100b described later, for example) is a controller that controls a machine tool comprising multiple control axes and used for machining by cutting of a work as a machining target (a work 10 or 20 described later, for example) by means of coordinated motion of the control axes. The controller comprises: a position command acquiring unit (a position command acquiring part 120 described later, for example) that acquires a position command directed to a servo motor (a servo motor 400 described later, for example) for driving a cutting tool or a position command directed to a servo motor for driving the work; a position acquiring unit (a position acquiring unit 122 described later, for example) that acquires the position of the cutting tool or that of the work as a position feedback value; a positional deviation calculating unit (a differential unit 106 described later, for example) that calculates positional deviation using the acquired position command and the acquired position feedback value; a spindle axis angle acquiring unit (a spindle axis angle acquiring unit 118 described later, for example) that acquires a spindle axis angle corresponding to an angle of rotation of a spindle axis of the rotated work or that of a spindle axis of the rotated cutting tool; an oscillation command calculating unit (an oscillation command calculating unit 102 described later, for example) that calculates an oscillation command using the acquired position command and the acquired spindle axis angle, or using the acquired position feedback value and the acquired spindle axis angle; an oscillation offset calculating unit (an oscillation offset calculating unit 104 described later, for example) that calculates an offset to be used for compensating for a delay in responsiveness of the servo motor from the oscillation command using the calculated positional deviation, the calculated oscillation command, and the spindle axis angle; and a driving unit (a speed and current control unit 116, an adder 114, or an adder 110 described later, for example) that determines a drive signal to be used for driving the servo motor based on the positional deviation, the oscillation command, and the oscillation offset, and outputs the drive signal.

(2) In the controller described in (1), to shred chips caused during the cutting, the oscillation command calculating unit may calculate the oscillation command for causing the cutting tool and the work to oscillate relative to each other in a machining direction in which the cutting tool travels.

(3) In the controller described in (1) or (2), the oscillation command calculating unit may determine an amplitude by multiplying the position command or multiplying the position feedback value by a first designated number, determine a first angle by multiplying the spindle axis angle by a second designated number, and calculate the oscillation command using the determined amplitude and the determined first angle.

(4) In the controller described in (3), the oscillation offset calculating unit may determine second positional deviation by adding the oscillation command to the positional deviation and calculate the offset using the determined second positional deviation and the first angle, thereby executing learning control.

(5) In the controller described in any one of (1) to (3), the spindle axis angle may be a spindle axis command output from an external higher-order device (a higher-order controller 200 described later, for example) or the position feedback value of the spindle axis.

(6) In the controller described in (3) or (4), the first designated number and the second designated number may be provided from an external higher-order device and the provided first designated number, and the provided second designated number may be used.

(7) In the controller described in (1) or (2), the first designated number may be calculated based on the position command and the spindle axis angle.

(8) In the controller described in any one of (1) to (7), the oscillation command calculating unit may start, stop, or finish calculation of the oscillation command based on a signal given from a higher-order controller.

(9) In the controller described in any one of (1) to (8), the oscillation offset calculating unit may start, stop, or finish calculation of the offset based on a signal given from a higher-order controller.

(10) In the controller described in (1) or (2), the oscillation offset calculating unit may determine second positional deviation by adding the oscillation command to the positional deviation, determine third positional deviation by extracting an oscillation frequency component from the second positional deviation, and calculate the offset using the determined third positional deviation and the first angle, thereby executing learning control.

(11) A control method according to the present invention is a method of controlling a machine tool comprising multiple control axes and used for machining by cutting of a work as a machining target by means of coordinated motion of the control axes. The method comprises: a position command acquiring step of acquiring a position command directed to a servo motor for driving a cutting tool or a position command directed to a servo motor for driving the work; a position acquiring step of acquiring the position of the cutting tool or that of the work as a position feedback value; a positional deviation calculating step of calculating positional deviation using the acquired position command and the acquired position feedback value; a spindle axis angle acquiring step of acquiring a spindle axis angle of the rotated work or that of the rotated cutting tool; an oscillation command calculating step of calculating an oscillation command using the acquired position command and the acquired spindle axis angle, or using the acquired position feedback value and the acquired spindle axis angle; an oscillation offset calculating step of calculating an offset to be used for compensating for a delay in responsiveness of the servo motor from the oscillation command using the calculated positional deviation, the calculated oscillation command, and the spindle axis angle; and a driving step of determining a drive signal to be used for driving the servo motor based on the positional deviation, the oscillation command, and the oscillation offset, and outputting the drive signal.

(12) A computer-readable recording medium storing a computer program according to the present invention causes a computer to operate as a controller that controls a machine tool comprising multiple control axes and used for machining by cutting of a work as a machining target by means of coordinated motion of the control axes. The computer-readable recording medium storing a computer program causes the computer to execute: a position command acquiring procedure of acquiring a position command directed to a servo motor for driving a cutting tool or a position command directed to a servo motor for driving the work; a position acquiring procedure of acquiring the position of the cutting tool or that of the work as a position feedback value; a positional deviation calculating procedure of calculating positional deviation using the acquired position command and the acquired position feedback value; a spindle axis angle acquiring procedure of acquiring a spindle axis angle of the rotated work or that of the rotated cutting tool; an oscillation command calculating procedure of calculating an oscillation command using the acquired position command and the acquired spindle axis angle, or using the acquired position feedback value and the acquired spindle axis angle; an oscillation offset calculating procedure of calculating an offset to be used for compensating for a delay in responsiveness of the servo motor from the oscillation command using the calculated positional deviation, the calculated oscillation command, and the spindle axis angle; and a driving procedure of determining a drive signal to be used for driving the servo motor based on the positional deviation, the oscillation command, and the oscillation offset, and outputting the drive signal.

According to the present invention, even if a machine tool uses a high oscillation frequency, the machine tool is still able to perform high-precision oscillating motion. In many cases, a control frequency of a servo controller is generally higher than a command distribution frequency. Thus, an oscillation command generated by the servo controller can be given a higher degree of precision responsive to a high oscillation frequency.

DETAILED DESCRIPTION OF THE INVENTION

Examples of an embodiment of the present invention will be described below. A servo controller described in this embodiment is for a machine tool including multiple control axes. The servo controller is for making the machine tool used for machining by cutting of a work as a machining target perform intermittent cutting by causing a cutting tool and the work to oscillate relative to each other, particularly in a machining direction, thereby shredding chips.

In particular, the servo controller suggested in this embodiment is characteristically intended to drive a servo motor for a machine tool so as to perform oscillating motion based on a command distributed to each axis of the machine tool and an angle from a spindle axis.

Figure 1A:
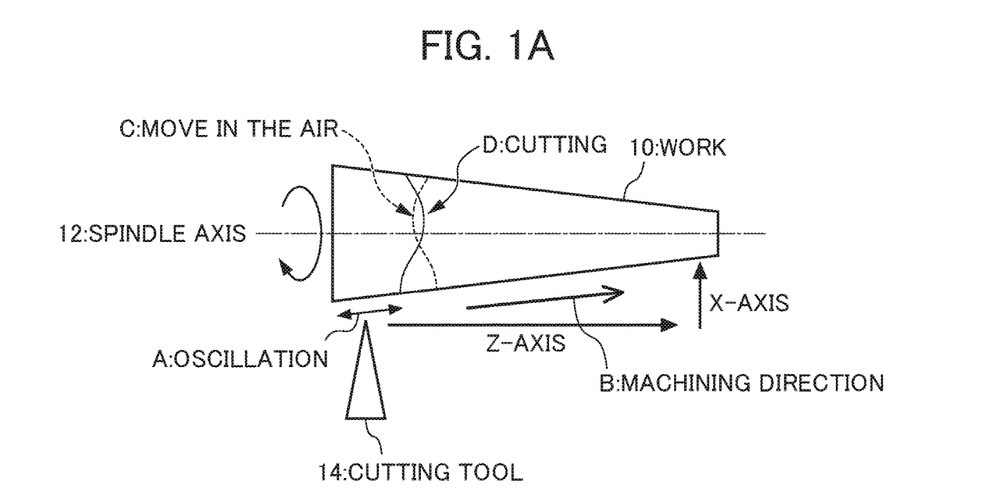
FIG. 1A is an explanatory view showing how machining by cutting is performed by generating oscillation.
Figure 1B:
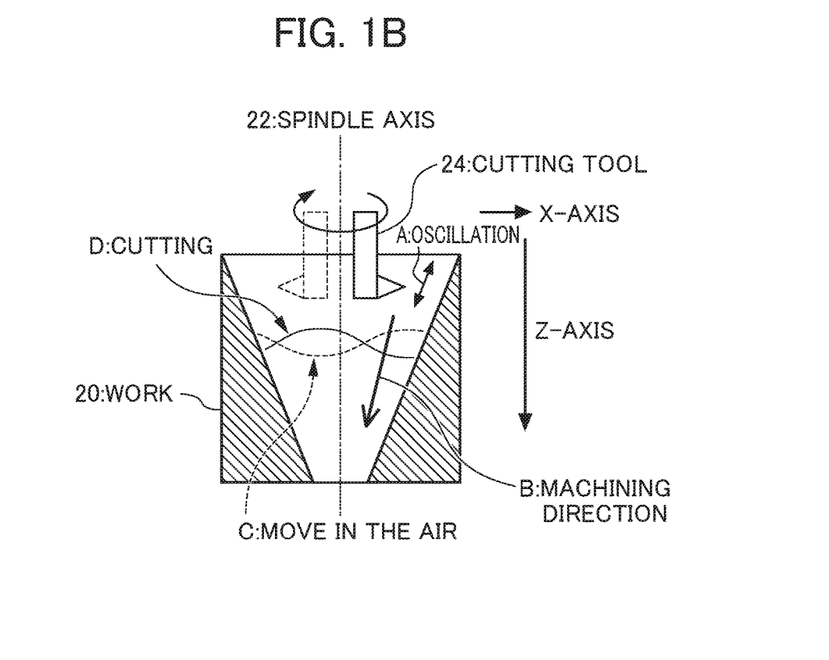
FIG. 1B is an explanatory view showing how machining by cutting is performed by generating oscillation.

FIGS. 1A and 1B are each an explanatory view for explaining oscillating motion. FIG. 1A is an explanatory view showing how a surface of a work 10 is subjected to machining by cutting with a cutting tool 14 while the work 10 is rotated about a spindle axis 12 as a rotary axis. As shown in FIG. 1A, an axis extending in the same direction as the spindle axis 12 is a Z-axis, and one of the axes orthogonal to the spindle axis 12 is an X-axis. The cutting tool 14 is used for cutting the surface of the work 10 based on a predetermined program. This machining proceeds along the Z-axis or in a machining direction B at a predetermined angle from the Z-axis. A direction in which the machining proceeds in this way is called the machining direction B.

During the aforementioned machining by cutting, oscillation A is applied to the cutting tool 14 in the machining direction B. The oscillation A is expected to achieve fine shredding of chips, for example. The oscillation A generates what is called vibration of the cutting tool 14 in the machining direction. The cutting tool 14 is to be placed in a contacting state and a non-contacting state with the work 10 repeatedly. If the cutting tool 14 contacts the work 10, the cutting tool 14 moves on the surface of the work 10 along a path of cutting D shown in FIG. 1A. If the cutting tool 14 does not contact the work 10, the cutting tool 14 moves on the surface of the work 10 along a path of move in the air C shown in FIG. 1A. The aforementioned intermittent cutting achieves fine shredding of chips or effective cooling of the cutting tool 14.

FIG. 1B is an explanatory view showing a different example of oscillation of a cutting tool. FIG. 1B is an explanatory view showing how a work 20 with an internal cavity is subjected to machining by cutting inside the cavity with a cutting tool 24. In FIG. 1B, the cutting tool 24 rotates relative to the work 20 and the axis of the cutting tool 24 functions as a spindle axis. Specifically, in this specification, a spindle axis means the following two axes. In FIG. 1A, the spindle axis 12 means an axis about which the work 10 rotates. In FIG. 1B, the spindle axis 22 means an axis about which the cutting tool 24 rotates. Like in FIG. 1A, an axis extending in the same direction as the spindle axis 22 in FIG. 1B is the Z-axis, and one of the axes orthogonal to the spindle axis 22 in FIG. 1B is the X-axis. The cutting tool 24 is used for cutting a surface of the inside of the cavity of the work 20 based on a predetermined program. Like in FIG. 1A, this machining proceeds in the machining direction B.

In FIG. 1B, the oscillation A is also applied to the cutting tool 24 in the machining direction B and the cutting tool 24 is also to be placed in a contacting state and a non-contacting state with the work 20 repeatedly. If the cutting tool 24 contacts the work 20, the cutting tool 24 moves on the surface of the work 20 along a path of the cutting D shown in FIG. 1B. If the cutting tool 24 does not contact the work 20, the cutting tool 14 moves on the surface of the work 20 along a path of move in the air C shown in FIG. 1B. FIGS. 1A and 1B both show the examples where the cutting tools 14 and 24 are caused to oscillate. Alternatively, the configuration may also be such that the work 10 or 20 is caused to oscillate.

The servo controller suggested in this embodiment is characteristically responsible for control over the aforementioned oscillating motion. In principle, oscillation can basically be achieved by giving a command for the oscillation in addition to a primary command to a servo motor for driving the cutting tool 14 (24), etc. As described above regarding the conventional art, however, generating high-frequency oscillation has been difficult in some cases for reason of the characteristics of the servo motor or movement of a cutting tool on a machining route.

Then, according to this embodiment, oscillating motion is made based on a command distributed to each axis and an angle of a spindle axis in a rotation direction. Further, an (oscillation) offset used for generating correct oscillation is calculated through learning control based on positional deviation that is fed back and a given oscillation command. Based on the positional deviation and the calculated offset, a command for oscillating motion is output. This command is given through an external amplifier to a servo motor of a machine tool. By doing so, oscillation can be controlled smoothly. The oscillation command includes the amount of feed of a cutting tool, the amount of forward motion, the amount of backward motion, a forward motion speed, and a backward motion speed of the cutting tool, for example.

Figure 2A:
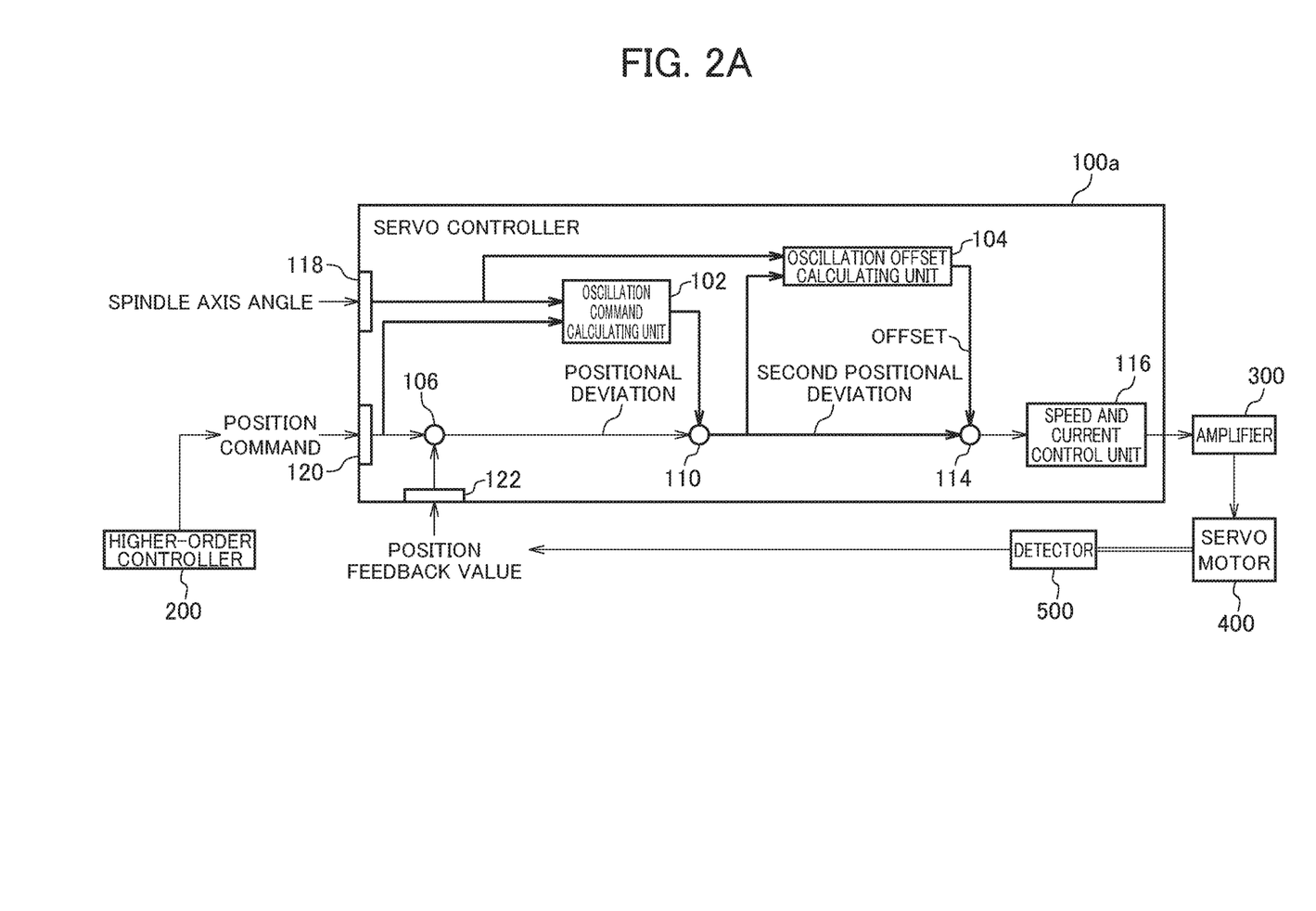
FIG. 2A is a configurational block diagram of a servo controller according to a first example of an embodiment.

A first example of the servo controller will be described next. FIG. 2A is a configurational block diagram of a servo controller 100a according to the first example. As shown in FIG. 2A, a higher-order controller 200 outputs a position command. The servo controller 100a drives a servo motor 400 of a machine tool (not shown in the drawings) to control a cutting tool of the machine tool or a work so as to comply with the position command. The servo controller 100a corresponds to a preferred example of a controller according to Claims. A servo controller 100b according to a second example described later also corresponds to a preferred example of the controller according to Claims.

The servo controller 100a is preferably formed of a computer including a CPU and a memory. Each unit described below (each calculating unit, a differential unit, an adder, an integrator, and a control unit) can be realized by execution of a predetermined program in the memory by the CPU. This program is stored in a computer-readable recording medium according to Claims.

The servo controller 100a according to this embodiment includes an oscillation command calculating unit 102, an oscillation offset calculating unit 104, a differential unit 106, an adder 110, an adder 114, and a speed and current control unit 116. The servo controller 100a further includes a spindle axis angle acquiring unit 118 that acquires a spindle axis angle, a position command acquiring unit 120 that acquires a position command from the higher-order controller 200, and a position acquiring unit 122 that acquires a position feedback value. The spindle axis angle means an angle of rotation of a spindle axis. Each of these acquiring units is preferably realized as an input interface of the computer and may include a buffer storing data received from outside, for example.

Figure 2B:
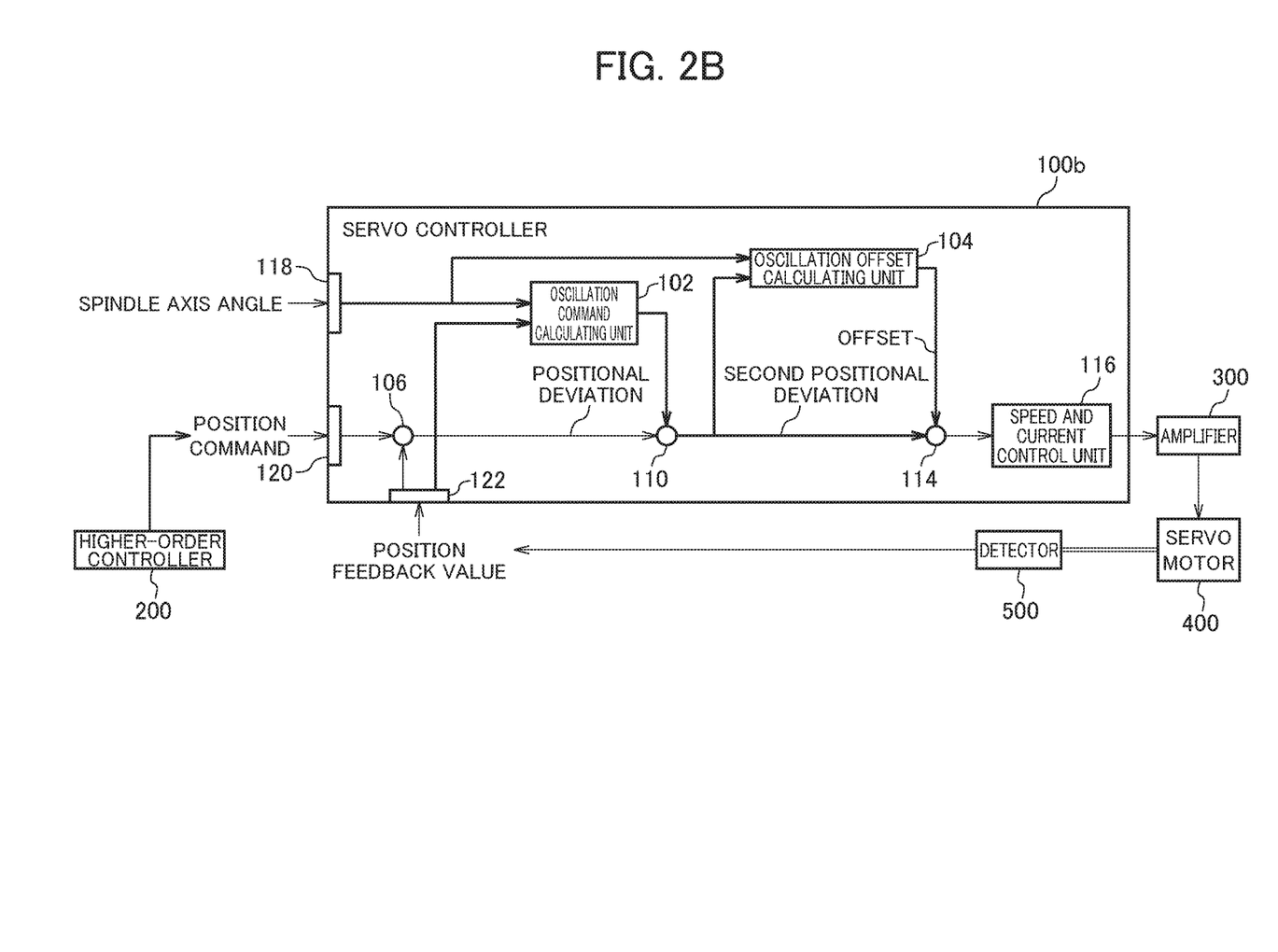
FIG. 2B is a configurational block diagram of a servo controller according to a second example of the embodiment.
Figure 3:
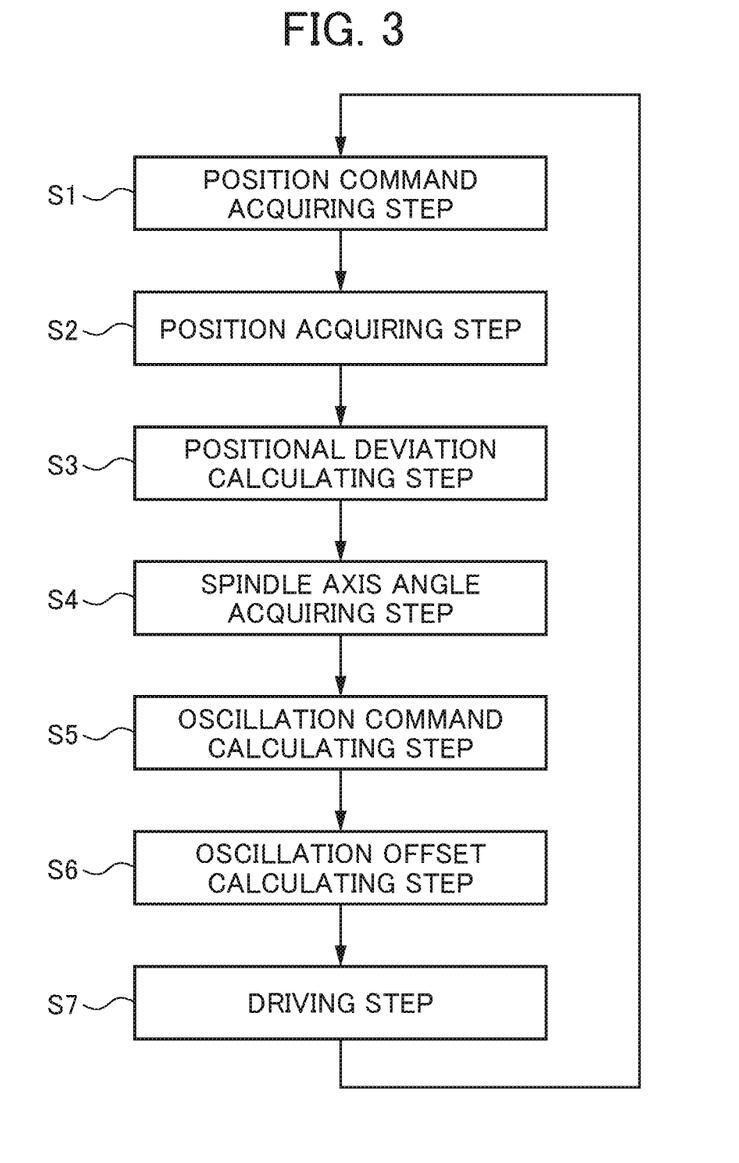
FIG. 3 is a flowchart showing the operation of the servo controller according to the embodiment.

The operation of the servo controller 100*a* will be described in detail below based on the configurational block diagram of FIG. 2A and the flowchart of FIG. 3. The position command acquiring unit 120 is an interface that acquires a position command directed to a servo motor for driving a cutting tool or a position command directed to a servo motor for driving a work, both output from the higher-order controller 200. The acquired position command is supplied to the differential unit 106 and the oscillation command calculating unit 102. The position command acquiring unit 120 may be configured not to supply the position command to the oscillation command calculating unit 102. Such a configuration will be described later by referring to FIG. 2B. The operation of acquiring the position command performed by the position command acquiring unit 120 corresponds to step S1 of FIG. 3.

The position acquiring unit 122 is an interface that acquires the position of the cutting tool or that of the work as a position feedback value. The acquired position feedback value is supplied to the differential unit 106. The operation of acquiring the position feedback value performed by the position acquiring unit 122 corresponds to step S2 of FIG. 3. The position acquiring unit 122 may be configured to supply the position feedback value to the oscillation command calculating unit 102. Such a configuration will be described later by referring to FIG. 2B.

The differential unit 106 determines positional deviation by calculating a differential between the acquired position command and the acquired position feedback value. The differential unit 106 corresponds to a preferred example of a positional deviation calculating unit according to Claims. The calculation of the positional deviation made by the differential unit 106 corresponds to step S3 of FIG. 3.

The adder 110 adds the positional deviation to an oscillation command calculated by the oscillation command calculating unit 102 to generate an adjusted oscillation command allowing for the positional deviation. The adjusted oscillation command is supplied to the oscillation offset calculating unit 104 and the adder 114.

The spindle axis angle acquiring unit 118 is an interface that acquires a spindle axis angle of the rotated work or that of the rotated cutting tool. The acquired spindle axis angle is supplied to the oscillation command calculating unit 102 and the oscillation offset calculating unit 104. The operation of acquiring the spindle axis angle performed by the spindle axis angle acquiring unit 118 corresponds to step S4 in the flowchart of FIG. 3. The spindle axis mentioned in this embodiment may be a rotary axis of the work or that of the cutting tool. The spindle axis angle means an angle of rotation of a spindle axis. This angle may be a spindle axis angle given in a spindle axis command from the higher-order controller 200 or may be a spindle axis angle as a position feedback value detected by a detector 500 described later.

The oscillation command calculating unit 102 calculates an oscillation command based on the acquired position command and the acquired spindle axis angle. More specifically, in this embodiment, the oscillation command calculating unit 102 determines an oscillation amplitude responsive to a distribution command output from the higher-order controller 200 and determines an oscillation frequency responsive to the angle of the spindle axis. The oscillation command is formed by using the determined oscillation amplitude and the determined oscillation frequency.

For example, the oscillation command calculating unit 102 can determine the amplitude by multiplying the position command by a first designated number. Further, the oscillation command calculating unit 102 can determine a first angle by multiplying the spindle axis angle by a second designated number. Then, the oscillation command calculating unit 102 can calculate the oscillation command using the determined amplitude and the determined first angle. The second designated number may be 0.5 or 1.5, for example. The first angle represents what is called a cycle of the oscillation command and also represents a learning cycle of learning control. These cycles match with each other. The calculation of the oscillation command made by the oscillation command calculating unit 102 corresponds to step S5 in the flowchart of FIG. 3.

The first designated number and the second designated number may be given to the servo controller 100*a* from the higher-order controller 200. In this case, the servo controller 100*a* stores the given designated numbers into a predetermined memory in the servo controller 100*a*. A user may set the first designated number and the second designated number by operating the higher-order controller 200. Alternatively, the user may set the first designated number and the second designated number by operating the servo controller 100*a* directly. The first designated number can be determined using the position command and the angle. The oscillation amplitude is generally required to be greater by 0.5 times or more than an amplitude that produces a stroke (a stroke in a machining direction) (of the work 10 or the cutting tool 24) determined during one rotation of the spindle axis. A speed of the spindle axis during one rotation can be estimated using change in the angle of the spindle axis (angular speed). A speed of movement of the spindle axis can be estimated using change in the position command (a speed command). Time required for one rotation of the spindle axis is determined using the estimated angular speed. Thus, a stroke of the work 10 (or the cutting tool 24) during one rotation of the spindle axis can be determined by multiplying the time of one rotation by the speed command. By using the stroke determined in this way, the oscillation amplitude can be determined (set). The first designated number can be determined using a relationship between the position command and the determined (set) oscillation amplitude. This calculation of the first designated number can be made by the servo controller 100*a* or the higher-order controller 200. The oscillation command calculating unit 102 may calculate various oscillation commands for different purposes. If a purpose is to shred chips caused during cutting, for example, the oscillation command calculating unit 102 preferably calculates an oscillation command so as to cause the cutting tool and the work to oscillate relative to each other in a machining direction in which the cutting tool travels.

The oscillation command calculating unit 102 is preferably configured to start, stop, or finish calculation of the oscillation command in response to instruction given from outside. For example, the oscillation command calculating unit 102 may be configured to start, stop, or finish calculation of the oscillation command in response to instruction from the higher-order controller 200 as an external device. The servo controller 100*a* is required to have an interface unit for receiving such instruction output from the higher-order controller 200. It is preferable that a different interface such as the spindle axis angle acquiring unit 118, etc. can be further used as this interface unit.

The oscillation offset calculating unit 104 calculates an offset to be used for compensating for a delay in responsiveness of a servo motor from the oscillation command using the positional deviation, the oscillation command, and the spindle axis angle. In this embodiment, the oscillation offset calculating unit 104 calculates the offset through learning control based on the positional deviation and the oscillation command. The calculation of the offset made by the oscillation offset calculating unit 104 corresponds to step S6 in the flowchart of FIG. 3.

More specifically, as described above, the oscillation offset calculating unit 104 determines second positional deviation by adding the positional deviation to the oscillation command (by using the adder 110). Based on the second positional deviation, the first angle, and the oscillation command, the oscillation offset calculating unit 104 calculates an offset for the oscillation command. Thus, the adder 110 forms a part of an oscillation offset calculating unit according to Claims. Specifically, the adder 110 and the oscillation offset calculating unit 104 correspond to preferred examples of the oscillation offset calculating unit according to Claims.

According to the above-described example of calculation of the offset, learning control is executed based on the second positional deviation. Meanwhile, third positional deviation is preferably determined further by extracting an oscillation frequency component from the second positional deviation and an offset is preferably calculated using the third positional deviation. In this case, the oscillation offset calculating unit 104 calculates an offset for the oscillation command based on the third positional deviation, the first angle, and the oscillation command.

The above-described third designated number may also be given to the servo controller 100*a* under instruction of the higher-order controller 200. Based on this instruction, the servo controller 100*a* may store the given third designated number into a predetermined memory. A user may set the third designated number by operating the higher-order controller 200. Alternatively, the user may set the third designated number by operating the servo controller 100*a* directly.

Like the oscillation command calculating unit 102, the oscillation offset calculating unit 104 is preferably configured to start, stop, or finish calculation of the offset in response to instruction given from outside. For example, the oscillation offset calculating unit 104 may be configured to start, stop, or finish calculation of the offset in response to instruction from the higher-order controller 200 as an external device. The oscillation command calculating unit 102 may further function as an interface unit for receiving such instruction output from the higher-order controller 200.

Next, the adder 114 adds the aforementioned calculated offset to the oscillation command allowing for the positional deviation, and supplies the oscillation command with the added offset to the speed and current control unit 116. Based on the oscillation command with the added offset, the speed and current control unit 116 determines a drive signal to be used for driving the servo motor and supplies (outputs) the drive signal to an external amplifier 300. Thus, the speed and current control unit 116, the adder 114, and the adder 110 correspond to preferred examples of a driving unit according to Claims. The output of the drive signal made by the speed and current control unit 116, the adder 114, and the adder 110 corresponds to step S7 in the flowchart of FIG. 3.

The amplifier 300 amplifies the aforementioned drive signal to supply the servo motor 400 with power sufficient for driving the servo motor 400. The servo motor 400 is driven using the (amplified) drive signal. FIG. 2A shows one amplifier 300 and one servo motor 400. Alternatively, multiple amplifiers 300 and multiple servo motors 400 may be provided. In the case of multi-axis control (in the case of a machine tool including multiple control axes), the number of the amplifiers 300 and that of the servo motors 400 may be determined to conform to the number of the control axes.

A detector 500 is provided to a drive shaft of the servo motor 400. The detector 500 is usable for detecting the position of the cutting tool and that of the work. The detector 500 can be configured by using a rotary encoder or a linear encoder, for example. The detector 500 outputs the above-described position feedback value to the position acquiring unit 122. Referring to the flowchart of FIG. 3, after step S7, the position feedback value detected by the detector 500 is acquired again in step S2. Specifically, the processes in steps S1, S2, etc. are performed again after step S7, meaning that all the steps are actually performed in parallel.

As described above, the servo controller 100*a* according to this embodiment causes a servo motor for a machine tool including multiple control axes to perform oscillating motion. In particular, according to the first example of this embodiment, an offset for oscillation is determined through learning control based on positional deviation and an oscillation command. This makes it possible to determine an offset efficiently to be used for compensating for a delay of a servo motor. As a result, even with the use of a high oscillation frequency, a machine tool is still allowed to perform high-precision oscillating motion.

A second example of the servo controller will be described below. FIG. 2B is a configurational block diagram of the servo controller 100*b* according to the second example. Except for the following points, the configuration shown in FIG. 2B is substantially the same as that of the servo controller 100*a* shown in FIG. 2A. In addition, except for the following points, the operation of the servo controller 100*b* is substantially the same as that of the servo controller 100*a*.

(1) Like in the above-described servo controller 100*a*, the position command acquiring unit 120 is an interface that acquires a position command directed to a servo motor for driving a cutting tool and a position command directed to a servo motor for driving a work, both output from the higher-order controller 200. Meanwhile, in the servo controller 100*b*, the position command acquired by the position command acquiring unit 120 is not supplied to the oscillation command calculating unit 102 but is supplied only to the differential unit 106.

(2) The oscillation command calculating unit 102 according to the first example calculates an oscillation command based on the acquired position command and the acquired spindle axis angle. By contrast, the oscillation command calculating unit 102 according to the second example uses a position feedback value instead of the position command. Thus, the substance of the process in step S5 of FIG. 3 differs in that this process proceeds by using the position feedback value instead of the position command. To follow this difference, the position acquiring unit 122 supplies the acquired position feedback value not only to the differential unit 106 but also to the oscillation command calculating unit 102. With the above-described configuration, the oscillation command calculating unit 102 according to the second example determines an oscillation amplitude responsive to the position feedback value and determines an oscillation frequency responsive to a spindle axis angle. The oscillation command is formed by using the determined oscillation amplitude and the determined oscillation frequency. Thus, the substance of the process in step S6 of FIG. 3 also differs in that this process proceeds by determining the oscillation amplitude responsive to the position feedback value and determining the oscillation frequency responsive to the spindle axis angle.

For example, the oscillation command calculating unit 102 determines the amplitude by multiplying the position command by the first designated number. Further, the oscillation command calculating unit 102 determines the first angle by multiplying the spindle axis angle by the second designated number. The oscillation command calculating unit 102 calculates the oscillation command using the determined amplitude and the determined first angle. The above-described configuration allows the servo controller 100b to calculate an oscillation command using an actual position feedback value, so that the calculated oscillation command can be more suited for an actual position of the cutting tool or that of the work.

While the embodiment of the present invention has been shown in detail, the foregoing description of the embodiment merely shows particular examples to be employed for implementing the present invention. The technical scope of the present invention is not to be limited to the above-described embodiment. Various changes of the present invention can be devised in a range not departing from the scope of the invention, and these changes are also covered by the technical scope of the present invention.

EXPLANATION OF REFERENCE NUMERALS 10, 20 Work
12, 22 Spindle axis
14, 24 Cutting tool
100a, 100b Servo controller
102 Oscillation command calculating unit
104 Oscillation offset calculating unit
106 Differential unit
110, 114 Adder
116 Speed and current control unit
118 Spindle axis angle acquiring unit
120 Position command acquiring unit
122 Position acquiring unit
200 Higher-order controller
300 Amplifier
400 Servo motor
500 Detector
A Oscillation
B Machining direction
C Move in the air
D Cutting

What is claimed is:

1. A controller that controls a machine tool comprising multiple control axes and used for machining by cutting of a work as a machining target by means of coordinated motion of the control axes, the controller comprising:
a position command acquiring unit that acquires a position command directed to a servo motor for driving a cutting tool or a position command directed to a servo motor for driving the work;
a position acquiring unit that acquires the position of the cutting tool or that of the work as a position feedback value;
a positional deviation calculating unit that calculates positional deviation using the acquired position command and the acquired position feedback value;
a spindle axis angle acquiring unit that acquires a spindle axis angle corresponding to an angle of rotation of a spindle axis of the rotated work or that of a spindle axis of the rotated cutting tool;
an oscillation command calculating unit that calculates an oscillation command for causing the servo motor to perform an oscillating motion using the acquired position command and the acquired spindle axis angle, or using the acquired position feedback value and the acquired spindle axis angle;
an oscillation offset calculating unit that calculates an offset using the calculated positional deviation, the calculated oscillation command, and the spindle axis angle, the offset being added to the oscillation command to generate an adjusted oscillation command for causing the servo motor to perform the oscillating motion; and
a driving unit that determines a drive signal to be used for driving the servo motor including causing the servo motor to perform the oscillating motion based on the positional deviation and the adjusted oscillation command, and outputs the drive signal.

2. The controller according to claim 1, wherein, to shred chips caused during the cutting, the oscillation command calculating unit calculates the oscillation command for causing the cutting tool and the work to oscillate relative to each other in a machining direction in which the cutting tool travels.

3. The controller according to claim 1, wherein the oscillation command calculating unit determines an amplitude by multiplying the position command or multiplying the position feedback value by a first designated number, determines a first angle by multiplying the spindle axis angle by a second designated number, and calculates the oscillation command using the determined amplitude and the determined first angle.

4. The controller according to claim 3, wherein the oscillation offset calculating unit determines second positional deviation by adding the oscillation command to the positional deviation and calculates the offset using the determined second positional deviation and the first angle, thereby executing learning control.

5. The controller according to claim 1, wherein the spindle axis angle is a spindle axis command output from an external higher-order device or the position feedback value of the spindle axis.

6. The controller according to claim 3, wherein the first designated number and the second designated number are provided from an external higher-order device and the provided first designated number and the provided second designated number are used.

7. The controller according to claim 1, wherein the first designated number is calculated based on the position command and the spindle axis angle.

8. The controller according to claim 1, wherein the oscillation command calculating unit starts, stops, or finishes calculation of the oscillation command based on a signal given from a higher-order controller.

9. The controller according to claim 1, wherein the oscillation offset calculating unit starts, stops, or finishes calculation of the offset based on a signal given from a higher-order controller.

10. The controller according to claim 1, wherein the oscillation offset calculating unit determines second positional deviation by adding the oscillation command to the positional deviation,
determines third positional deviation by extracting an oscillation frequency component from the second positional deviation, and calculates the offset using the determined third positional deviation and the first angle, thereby executing learning control.

11. A method of controlling a machine tool comprising multiple control axes and used for machining by cutting of a work as a machining target by means of coordinated motion of the control axes, the method comprising:
- a position command acquiring step of acquiring a position command directed to a servo motor for driving a cutting tool or a position command directed to a servo motor for driving the work;
- a position acquiring step of acquiring the position of the cutting tool or that of the work as a position feedback value;
- a positional deviation calculating step of calculating positional deviation using the acquired position command and the acquired position feedback value;
- a spindle axis angle acquiring step of acquiring a spindle axis angle of the rotated work or that of the rotated cutting tool;
- an oscillation command calculating step of calculating an oscillation command for causing the servo motor to perform an oscillating motion using the acquired position command and the acquired spindle axis angle, or using the acquired position feedback value and the acquired spindle axis angle;
- an oscillation offset calculating step of calculating an offset using the calculated positional deviation, the calculated oscillation command, and the spindle axis angle, the offset being added to the oscillation command to generate an adjusted oscillation command for causing the servo motor to perform the oscillating motion; and
- a driving step of determining a drive signal to be used for driving the servo motor including causing the servo motor to perform the oscillating motion based on the positional deviation and the adjusted oscillation command, and outputting the drive signal.

12. A non-transitory computer-readable recording medium storing a computer program that causes a computer to operate as a controller that controls a machine tool comprising multiple control axes and used for machining by cutting of a work as a machining target by means of coordinated motion of the control axes, the computer-readable recording medium storing a computer program causing the computer to execute:
- a position command acquiring procedure of acquiring a position command directed to a servo motor for driving a cutting tool or a position command directed to a servo motor for driving the work;
- a position acquiring procedure of acquiring the position of the cutting tool or that of the work as a position feedback value;
- a positional deviation calculating procedure of calculating positional deviation using the acquired position command and the acquired position feedback value;
- a spindle axis angle acquiring procedure of acquiring a spindle axis angle of the rotated work or that of the rotated cutting tool;
- an oscillation command calculating procedure of calculating an oscillation command for causing the servo motor to perform an oscillating motion using the acquired position command and the acquired spindle axis angle, or using the acquired position feedback value and the acquired spindle axis angle;
- an oscillation offset calculating procedure of calculating an offset using the calculated positional deviation, the calculated oscillation command, and the spindle axis angle, the offset being added to the oscillation command to generate an adjusted oscillation command for causing the servo motor to perform the oscillating motion; and
- a driving procedure of determining a drive signal to be used for driving the servo motor including causing the servo motor to perform the oscillating motion based on the positional deviation and the adjusted oscillation command, and outputting the drive signal.

* * * * *